United States Patent

[11] 3,556,451

[72] Inventor  Rune Arvid Efraim Ostlund
                Varnamo, Sweden
[21] Appl. No. 760,033
[22] Filed     Sept. 16, 1968
[45] Patented  Jan. 19, 1971
[73] Assignee  Firma Karl Mathsson
                Varnamo, Sweden
                a Swedish firm
[32] Priority  Sept. 26, 1967
[33]           Sweden
[31]           No. 13207/1967

[54] ARRANGEMENT FOR DETACHABLY MOUNTING A LEG MEMBER TO AN OBJECT SUCH AS AN ARTICLE OF FURNITURE
4 Claims, 14 Drawing Figs.

[52] U.S. Cl. .................................................. 248/188,
                                                     248/188.8
[51] Int. Cl. .......................................... F16m 11/16
[50] Field of Search .......................................... 248/188,
     188.8, 223, 168, 151; 287/20, 20.3; 24/213, 214,
                                                     213R, 220

[56]                 References Cited
                 UNITED STATES PATENTS
2,529,420  11/1950  Ramquist ..................... 24/214
                   FOREIGN PATENTS
  273,054   6/1927  Great Britain ................ 248/188
1,393,200   2/1965  France ......................... 248/188.8
1,162,983   2/1964  Germany ...................... 248/188.8
  601,577   2/1960  Italy ............................ 24/214
   97,973   3/1961  Norway ........................ 248/188
  320,253   5/1957  Switzerland ................. 248/151

Primary Examiner—Marion Parsons, Jr.
Attorney—Young and Thompson

ABSTRACT: A leg for detachably mounting to an object such as an article of furniture comprises two or more upper parts which spring apart relative to each other. When these parts are pressed together, they can be inserted into a recess in the object. The leg is fixed to the object by the leg parts springing outwardly away from one another. The leg parts are inserted so as to contact the upper wall of the recess in which position a groove or the like is flush with and engages a cooperating tongue, projection or the like on the object.

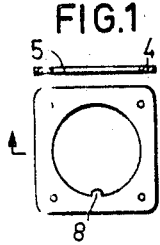
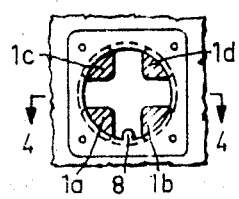
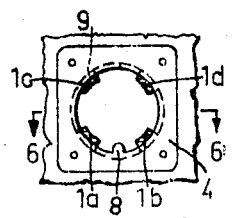
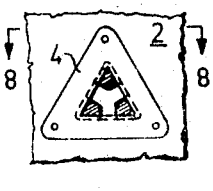
FIG.1  FIG.3  FIG.5  FIG.7
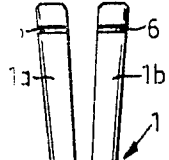
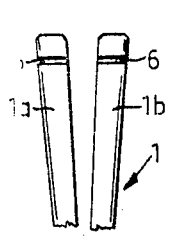
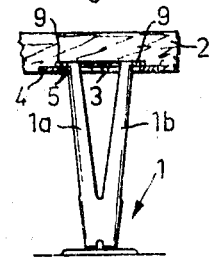
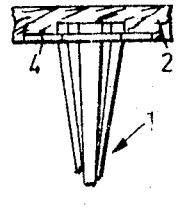
FIG.2  FIG.4  FIG.6  FIG.8
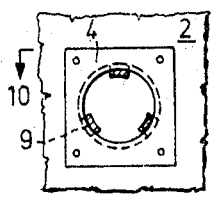
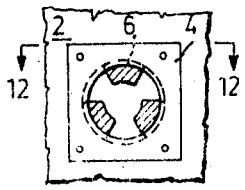
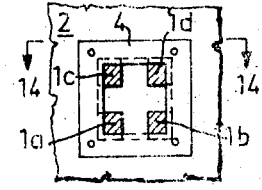
FIG.9  FIG.11  FIG.13
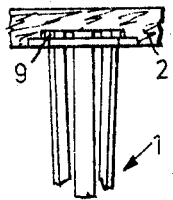
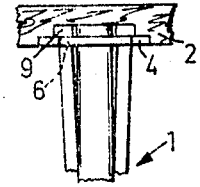
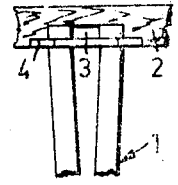
FIG.10  FIG.12  FIG.14
INVENTOR.
RUNE ARVID EFRAIM ÖSTLUND

ARRANGEMENT FOR DETACHABLY MOUNTING A LEG MEMBER TO AN OBJECT SUCH AS AN ARTICLE OF FURNITURE

The present invention is concerned with an arrangement for detachably mounting a leg member to an object such as an article of furniture.

In the manufacture, storage, transportation and selling of furniture more and more attention is being paid to the problem of designing the furniture in such a way that it can be assembled and dismantled rapidly and simply without the use of special tools. The problem has proved very difficult to resolve since in addition to the requirement of simple assembly, the requirements of mechanical strength and appearance must also be fulfilled.

Various arrangements have been suggested in the past for detachably mounting legs to pieces of furniture and the like, in which the leg member is held against the piece of furniture by spring action to remain fixed to the same.

In these arrangements, special fixing means have been used, which cause the leg to be springingly held against the article of furniture, but in addition to this the possibility of utilizing the spring effect of the various parts of a multipart leg for urging these parts against each other and thereby causing them to be fixed in position has also been availed upon. These solutions, however, have generally been of unattractive design and complicated, i.e. have not afforded the desired possibility of simple assembly. Moreover, they cannot be used to advantage when assembling short legs.

The present invention, which eliminates the aforementioned disadvantages and which affords particular advantages in the case of short legs, is characterized in that the leg presents two or more parts which spring outwardly in relation to each other and the upper portions of which are capable of being inserted when pressed in towards each other into a recess in the object, e.g. an article of furniture, and which subsequent to being inserted into said recess fix the leg to the article by springing out in a direction away from each other.

The leg according to the invention can, to advantage, be made of wood although steel, sheet metal, plastic and other material may also be used. The improvement according to the invention thus provides when, for instance, wood is used, without excess over dimensioning of the leg, a high degree of stability together with the advantages of simple assembly and tasteful design.

In a preferred embodiment of the invention, the upper portions of the parts are provided with a groove, recess, tongue or the like which subsequent to the parts springing apart cooperates with a corresponding tongue, recess, projection or the like of the corresponding member in the adjacent surface. In this way a fixing means is obtained which in the assembled position of the leg is substantially invisible. If in addition the springing parts of the leg are, in accordance with a further suitable embodiment, inserted against a stop in the recess, preferably so that the upper surfaces of the parts come into contact with the upper restricting wall of the recess in which the groove or corresponding detail is in register with the cooperating tongue or corresponding detail, a particularly stable fixation of the leg can be obtained without any additional arrangements whatsoever being necessary.

In another development of the invention, the bottom of the recess is covered by a member which either comprises an integral part of the article, e.g. an article of furniture, or comprises an element fixed thereto, e.g. a fitting. The thickness of the member, e.g. the fitting, suitably corresponds to the depth of a groove formed in a leg part, the member entering the groove in the fixed position. Hence, the member, e.g. the fitting, itself forms the element which cooperates with the groove. Alternatively, particularly if the leg is made of a plastic material, the springy leg parts present an upper, outwardly directed projection which in the fixing position enters into the portion of the recess which is defined at the bottom by the aforesaid member, e.g. the fitting. In this instance, the projection may suitably be of such thickness that it essentially occupies the whole space between the wall of the recess and the member, e.g. the fitting.

The leg may be made from a blank of arbitrary cross section, e.g. circular, square, triangular or polygonal shape; whereby said blank imparts the possibility of resilient expansion after the parts have been assembled by making slits in one of said parts. Because of the many possibilities of variation of design within the scope of the invention, high aesthetic requirements can be fulfilled.

Additional characterizing features and advantages of the invention will be apparent from the following detailed description of a number of embodiments of the invention; the embodiments being chosen by way of examples only. The following description is made with reference to the accompanying drawings, in which FIG. 1 shows a fitting which is intended to be attached to an article of furniture in which a slotted leg such as that illustrated in FIG. 2 is to be detachably mounted. Fig. 3 is a section at right angles to the axis of the leg taken through the fixing means of the leg when said leg is in its position of attachment. FIG. 4 is a section taken parallel with the axis of the leg along the line 4–4 in FIG. 3. FIGS. 5 and 6 show corresponding sections taken through a modified embodiment. FIGS. 7—14 show further modified embodiments, the FIGS. having odd numbers showing sections at right angles to the axis of the leg, each of the FIGS. having even numbers showing sections parallel to the axis of the leg placed in the manner shown in the associated FIG. with the nearest lowest odd number.

A leg 1 of relatively short length is to be detachably mounted to an article of furniture 2 such as a table, chair, cupboard, sofa, bed or the like. As can be seen from FIGS. 2—4, the leg presents an upper attachment part produced by slotting a wooden blank, for instance, the said attachment part itself comprising four parts 1 a, 1 b, 1 c, 1 d which spring outwards in a direction away from each other. The article of furniture 2 is provided with a recess 3 which is partly covered by a fitting 4 provided with an opening 5. The fitting is suitably mounted on a shoulder in the under surface of the piece of furniture so that the under surface of the fitting coincides with the under surface of the said piece of furniture. Each of the leg parts 1a—1b is provided with a groove 6, the depth of which corresponds to the thickness of the fitting 4. The groove is located at a distance from the upper wall of the recess which corresponds to the distance of the fitting from the wall. When inserted, the leg is thus bottomed in the recess, i.e. the upper surfaces of the springing parts abut the upper wall of the recess simultaneously as the leg as a result of the expanding springing action of the parts is held pressed against the edge of the fitting cooperating with the groove 6.

When the leg is to be assembled, the parts are pressed in towards each other so that the leg can be inserted into the hole 5 in the fitting, the diameter and circumference of which, respectively, are such that the leg cannot be inserted until the parts have been pressed together. Subsequent to inserting the leg, the parts are released whereupon they automatically spring out into the correct position. Assembly of the leg is thus completed. When dismantling the leg, the parts are pressed together so that the leg can be removed.

Instead of the fitting 4 a member, which is an integral part of the article of furniture such as a projection can be used; this design being expedient if the article of furniture or a part thereof is made of sheet metal or a plastic material.

Instead of the groove 6, the leg parts 1a—1d may be provided with a recess of another configuration or present a tongue or projection which cooperates with a corresponding recessed portion of the article of furniture or a fitting attached thereto.

If, as shown in FIGS. 1—5, the leg, the recess and the opening in the fitting have an essentially circular cross section, a special fixing member 8 can be used to prevent the leg from turning in the recess.

In the embodiment illustrated in FIGS. 5—6 the outwardly springing upper ends of the leg parts are each provided with a projection 9 which engages in the space of the recess 3, the recess being defined at the bottom by the fitting 4 or a corresponding member. The height of the projection suitably corresponds to the vertical distance between the fitting or corresponding member and the upper restricting surface of the recess. This design is particularly suitable if the leg is made of sheet metal or a plastic material.

FIGS. 7—14 illustrate a number of expedient modifications of the embodiments according to FIGS. 1—7. Thus FIGS. 7 and 8 show a leg essentially triangular in shape and presenting three slitted parts, the recess and fitting presenting a corresponding triangular shape. FIGS. 9—12 show legs provided with three springing leg parts which when pressed together present an essentially circular cross section firstly comprising leg parts (FIGS. 9 and 10) provided with projections 9 and secondly comprising grooves 6 which cooperate with the edge of a fitting 4 (FIGS. 11 and 12).

FIG. 13 shows a square leg comprising four springing parts 1a—1dtion.

It is also possible in the case of slotted wooden leg parts, for instance, to obtain the springing action of said parts by using a special element, for instance a wedge, which is inserted between the said leg parts to enable the spring force of said parts to be regulated, if desired.

It will be evident from the aforegoing that detachable legs designed according to the invention can be made in many different ways and may have many different configurations. No tools are required for assembling the leg, nor any special auxiliary parts, and assembly can be effected in a matter of seconds. In addition, it is impossible to assemble the leg wrongly, and there is no risk of damaging the leg during the assembling operation.

I claim:

1. An arrangement for detachably mounting a leg to an article of furniture or the like, the article of furniture having a blind recess therein, the leg having at least three integral portions interconnected to spring apart relative to each other and having upper free ends which when pressed together are capable of insertion in said recess with separations between said at least three portions exposed in the assembled condition of the leg to the article of furniture so that the upper portion of the leg may be grasped and squeezed for subsequent removal of the leg from the article of furniture, said upper free ends having outwardly opening groove means therein, and a plate secured to the under side of said article of furniture and partially closing said recess, said plate having an opening therethrough for the reception of said upper free ends, said plate extending into said groove means when said upper free ends are disposed in said recess and are substantially in contact with the bottom of the recess.

2. An arrangement as claimed in claim 1, and at least one projection on said plate engaging a portion of said upper free ends to prevent rotation of said upper free ends in said recess.

3. An arrangement as claimed in claim 1, said recess being substantially circular, and means on said article of furniture engaging with the upper end of the leg to prevent rotation of the upper end of the leg in said recess.

4. An arrangement as claimed in claim 1, said upper free ends tapering upwardly outwardly.